(12) United States Patent
Liu et al.

(10) Patent No.: US 12,425,060 B2
(45) Date of Patent: Sep. 23, 2025

(54) COMMUNICATIONS UNIT HAVING A FASTENING DEVICE FOR FASTENING TO A COMPONENT OF AN IN PARTICULAR SINGLE-TRACK VEHICLE

(71) Applicant: Robert Bosch GmbH, Stuttgart (DE)

(72) Inventors: Jian Liu, Lund (SE); Mats-Ake Ekbladh, Bjärred (SE)

(73) Assignee: ROBERT BOSCH GMBH, Stuttgart (DE)

( * ) Notice: Subject to any disclaimer, the term of this patent is extended or adjusted under 35 U.S.C. 154(b) by 554 days.

(21) Appl. No.: 17/937,957

(22) Filed: Oct. 4, 2022

(65) Prior Publication Data
US 2023/0353179 A1  Nov. 2, 2023

(30) Foreign Application Priority Data
Apr. 29, 2022 (DE) .................. 20 2022 102 322.0

(51) Int. Cl.
*H04B 1/3822* (2015.01)
*B62J 11/00* (2020.01)

(52) U.S. Cl.
CPC ............ *H04B 1/3822* (2013.01); *B62J 11/00* (2013.01)

(58) Field of Classification Search
CPC .............................. H04B 1/3822; B62J 11/00
See application file for complete search history.

(56) References Cited

U.S. PATENT DOCUMENTS

| | | | | |
|---|---|---|---|---|
| 5,368,122 A * | 11/1994 | Chou | ...... | B62M 6/60 |
| | | | | 280/214 |
| 5,450,915 A * | 9/1995 | Li | ...... | H02K 7/14 |
| | | | | 310/67 R |
| 5,662,187 A * | 9/1997 | McGovern | ...... | B62M 6/65 |
| | | | | 180/206.6 |
| 6,077,908 A * | 6/2000 | Yahiro | ...... | C08L 59/00 |
| | | | | 525/218 |
| 6,920,953 B2 * | 7/2005 | McGovern | ...... | B62M 6/45 |
| | | | | 280/258 |

(Continued)

FOREIGN PATENT DOCUMENTS

| | | | | |
|---|---|---|---|---|
| EP | 2946959 A2 * | 11/2015 | ..... | B60K 17/04 |
| EP | 3614360 A1 * | 2/2020 | ..... | G08G 1/094 |

(Continued)

*Primary Examiner* — Hai V Nguyen
(74) *Attorney, Agent, or Firm* — NORTON ROSE FULBRIGHT US LLP (57) ABSTRACT

A communication unit. The communication unit has an electromagnetic transmitter and/or receiver device and a fastening device for the electromagnetic transmitter and/or receiver device for fastening to a component, preferably to a drive unit and/or a frame, of a vehicle, preferably of a single-track vehicle such as an electric bicycle, including an in particular flat, essentially rectangular carrier, especially having two essentially oppositely situated sides on which the transmitter and/or receiver device is situated, at least a first holding element, the first holding element being designed to fasten the carrier to the component, the first holding element being made of metal, and the first holding element covering at least 50% of an in particular essentially rectangular side of the carrier that faces the component in a fastened state of the carrier.

23 Claims, 7 Drawing Sheets

(56) References Cited

U.S. PATENT DOCUMENTS

| | | | | |
|---|---|---|---|---|
| 7,267,352 B2* | 9/2007 | Ishikawa | | B62M 6/90 |
| | | | | 429/96 |
| 8,220,679 B2* | 7/2012 | Yoshida | | H01M 50/202 |
| | | | | 429/96 |
| 8,654,818 B2* | 2/2014 | Kosugi | | H04L 1/0083 |
| | | | | 370/300 |
| 8,923,758 B2* | 12/2014 | Stuebing | | H01Q 1/32 |
| | | | | 455/39 |
| 9,064,198 B2* | 6/2015 | Kato | | G06K 19/07773 |
| 9,156,398 B2* | 10/2015 | Voos | | B60R 9/00 |
| 9,777,774 B2* | 10/2017 | Biechele | | B62K 19/34 |
| 10,011,342 B2* | 7/2018 | Gai | | B63H 25/38 |
| 10,076,929 B1 | 9/2018 | Lenz | | B62L 5/00 |
| 10,601,254 B2* | 3/2020 | Kato | | G06K 19/07771 |
| 10,645,708 B2* | 5/2020 | Klemp | | H04B 7/0617 |
| 10,773,765 B2* | 9/2020 | Mühle | | B62J 15/02 |
| 11,218,788 B2* | 1/2022 | Champagne | | H04R 1/026 |
| 11,377,167 B2* | 7/2022 | Le Rodallec | | B60L 53/14 |
| 11,827,301 B2* | 11/2023 | Hallen | | B62J 45/20 |
| 12,049,274 B2* | 7/2024 | Montague | | B62J 7/06 |
| 12,168,495 B2* | 12/2024 | Komada | | B62K 23/06 |
| 2004/0003952 A1* | 1/2004 | McGovern | | B62M 6/60 |
| | | | | 180/220 |
| 2004/0179206 A1* | 9/2004 | Tassakos | | G01B 11/00 |
| | | | | 356/602 |
| 2007/0252703 A1* | 11/2007 | Kato | | G06K 19/07749 |
| | | | | 340/572.7 |
| 2012/0206278 A1* | 8/2012 | Lamping | | B60C 23/0498 |
| | | | | 340/945 |
| 2012/0236951 A1* | 9/2012 | Kosugi | | H04L 1/0061 |
| | | | | 375/259 |
| 2014/0055253 A1* | 2/2014 | Voos | | B60R 9/00 |
| | | | | 340/431 |
| 2014/0196970 A1* | 7/2014 | Biechele | | B62K 19/34 |
| | | | | 180/206.4 |
| 2014/0291039 A1* | 10/2014 | Hanson | | G01L 1/06 |
| | | | | 177/133 |
| 2014/0319299 A1* | 10/2014 | Baum | | B60C 23/0452 |
| | | | | 248/251 |
| 2015/0016563 A1* | 1/2015 | Mahdavifar | | H04B 7/0697 |
| | | | | 375/295 |
| 2016/0014793 A1* | 1/2016 | Klemp | | H04W 48/18 |
| | | | | 370/329 |
| 2016/0018252 A1* | 1/2016 | Hanson | | G01G 19/024 |
| | | | | 73/774 |
| 2018/0301035 A1* | 10/2018 | Tetsuka | | G08G 1/163 |
| 2018/0326255 A1* | 11/2018 | Schranz | | A63B 21/08 |
| 2018/0370594 A1* | 12/2018 | Foley | | B62K 19/40 |
| 2019/0074725 A1* | 3/2019 | Kato | | H02J 50/12 |
| 2019/0152554 A1* | 5/2019 | Zeng | | B62K 23/02 |
| 2019/0263281 A1* | 8/2019 | Wang | | B60L 53/60 |
| 2019/0382067 A1* | 12/2019 | Mühle | | B62M 6/90 |
| 2020/0050204 A1* | 2/2020 | Chang | | H04W 76/10 |
| 2020/0223507 A1* | 7/2020 | Le Rodallec | | B60L 53/16 |
| 2020/0242922 A1* | 7/2020 | Dulberg | | G08G 1/166 |
| 2020/0251917 A1* | 8/2020 | Ljung | | H02J 50/80 |
| 2020/0269951 A1* | 8/2020 | Gruber | | B62M 11/02 |
| 2020/0378797 A1* | 12/2020 | Kech | | G01D 11/30 |
| 2021/0070397 A1* | 3/2021 | Komada | | B62M 9/132 |
| 2021/0197913 A1* | 7/2021 | Montez | | B62K 23/02 |
| 2021/0221211 A1* | 7/2021 | Borroni-Bird | | B62M 6/85 |
| 2021/0371044 A1* | 12/2021 | Kosaka | | B62J 45/413 |
| 2021/0377638 A1* | 12/2021 | Champagne | | H04R 3/00 |
| 2022/0041116 A1* | 2/2022 | Lev | | B60R 11/02 |
| 2022/0106002 A1* | 4/2022 | Montague | | B62J 45/00 |
| 2022/0242442 A1* | 8/2022 | McNeely | | B60W 50/14 |
| 2022/0306043 A1* | 9/2022 | Ford | | B62H 5/08 |
| 2022/0306226 A1* | 9/2022 | Miller | | B62H 5/14 |
| 2022/0306237 A1* | 9/2022 | Miller | | B62J 50/20 |
| 2022/0307295 A1* | 9/2022 | Liedtke | | E05B 77/02 |
| 2022/0311468 A1* | 9/2022 | Stephens | | H04W 4/80 |
| 2022/0332260 A1* | 10/2022 | Lindstedt | | G01C 21/265 |
| 2022/0332389 A1* | 10/2022 | Braedt | | B62J 43/28 |
| 2022/0398412 A1* | 12/2022 | Govardhanam | | G06T 11/00 |
| 2023/0021733 A1* | 1/2023 | Endo | | H02J 50/10 |
| 2023/0078660 A1* | 3/2023 | Kosaka | | B62J 50/21 |
| | | | | 280/288.4 |
| 2023/0085552 A1* | 3/2023 | Schnee | | B62J 27/00 |
| | | | | 455/404.1 |
| 2023/0126940 A1* | 4/2023 | Hsu | | B62J 43/20 |
| | | | | 280/288.4 |
| 2023/0168094 A1* | 6/2023 | Beaurepaire | | G01C 21/3697 |
| | | | | 701/425 |
| 2023/0241986 A1* | 8/2023 | Saal | | B60L 53/12 |
| | | | | 320/108 |
| 2023/0269605 A1* | 8/2023 | Masuda | | H04W 24/02 |
| | | | | 455/103 |
| 2023/0336006 A1* | 10/2023 | Kobayashi | | H02J 7/0031 |
| 2023/0353179 A1* | 11/2023 | Liu | | H04B 1/3822 |
| 2023/0382256 A1* | 11/2023 | Tuukkanen | | H02J 7/0048 |
| 2023/0394353 A1* | 12/2023 | Beaurepaire | | G08G 1/0129 |
| 2023/0408595 A1* | 12/2023 | Ikeda | | H01M 10/4264 |
| 2024/0053163 A1* | 2/2024 | Shtok | | G01C 21/365 |
| 2024/0208346 A1* | 6/2024 | Kim | | B62H 3/04 |
| 2024/0290898 A1* | 8/2024 | Akhavan-Tafti | | H10F 77/488 |
| 2024/0326761 A1* | 10/2024 | Putz | | B60T 8/172 |
| 2024/0334346 A1* | 10/2024 | Chiang | | G08G 1/16 |

FOREIGN PATENT DOCUMENTS

| | | | | |
|---|---|---|---|---|
| EP | 3756985 A1 * | 12/2020 | | |
| EP | 3838729 A1 * | 6/2021 | | B62K 15/008 |
| EP | 4046873 A1 * | 8/2022 | | B60R 9/06 |
| EP | 3652017 B1 * | 10/2024 | | B60L 53/16 |
| WO | WO-2016091319 A1 * | 6/2016 | | B60L 50/20 |

* cited by examiner

Fig. 6

COMMUNICATIONS UNIT HAVING A FASTENING DEVICE FOR FASTENING TO A COMPONENT OF AN IN PARTICULAR SINGLE-TRACK VEHICLE

CROSS REFERENCE

The present application claims the benefit under 35 U.S.C. § 119 of German Patent Application No. DE 20 2022 102 322.0 filed on Apr. 29, 2022, which is expressly incorporated herein by reference in its entirety.

BACKGROUND INFORMATION

The present invention relates to a communications unit having an electromagnetic transmitter and/or receiver unit and a fastening device for the electromagnetic transmitter and/or receiver device for fastening it to a component, preferably to a drive unit or a frame of a vehicle, preferably of a single-track vehicle such as an electric bicycle, a pedelec or similar vehicle.

In addition, the present invention relates to an in particular single-track vehicle including a communications unit.

The present invention furthermore pertains to a drive unit for a vehicle, in particular for a single-track vehicle equipped with a communications unit.

Although the present invention can basically be applied to various kinds of vehicles, the present invention will be described with reference to bicycles in the form of electric bicycles or pedelecs.

Although it is generally possible to apply the present invention to all kinds of electromagnetic transmitter and/or receiver devices, the present invention is described with reference to an antenna as a transmitter and/or receiver device.

For instance, antennas are often mounted on electric bicycles where they are employed to transmit and receive GPS data. This makes it possible to determine the speed or the position of the electric bicycle. Generally, the antenna is fixed in place directly on a frame or a drive unit of the electric bicycle, e.g., on an electric motor, so that it can easily be connected to a control unit of the electric bicycle and is protected from external effects such as rain.

If the geometry of the transmitter and/or receiver unit restricts the physical size of the electric mass, which simultaneously corresponds to the reference plane of the antenna, e.g., due to industrial specifications, the antenna power may be restricted. This means that the TRP value—a measure of the entire emitted power—and/or the TIS value—a measure of the entire isotropic sensitivity—may drop below required threshold values.

SUMMARY

In one example embodiment, the present invention provides a communications unit having an electromagnetic transmitter and/or receiver device and a fastening device for the electromagnetic transmitter and/or receiver device for fastening it to a component, preferably to a drive unit and/or a frame of a vehicle, preferably a single-track vehicle such as an electric bicycle, including an in particular flat and essentially rectangular carrier, especially having two essentially oppositely situated sides on which a transmitter and receiver device can be positioned; at least a first holding element, the first holding element being designed to fasten the carrier to the component, the first holding element being made from metal and the first holding element covering at least 50% of an especially essentially rectangular side of the carrier facing the component in a fastened state of the carrier. In one embodiment, the present invention provides an in particular single-track vehicle which includes a communications unit according to the present invention.

One of the advantages achieved in this way is that the transmitter and/or receiver device of the communications unit is able to be fastened to the component of the in particular single-track vehicle in an accurate and therefore reproducible manner in terms of the position and angle. A further advantage is that the metallic holding element allows for an extension of the reference plane for the transmitter and/or receiver device, to a frame and/or a drive unit of the vehicle by capacitively coupling the holding element with the transceiver and/or receiver device.

The communications device has an electromagnetic transmitter and/or receiver device and a fastening device for fastening the transmitter and/or receiver device to a component of the in particular single-track vehicle. The fastening device includes a carrier. More specifically, the in particular flat and essentially rectangular carrier may be understood as a holding means, a housing or the like for the transmitter and/or receiver device. The carrier may have different geometrical shapes. More specifically, it has a low height in comparison with the length and width of the carrier. The cross-section of the carrier in the direction of the length and width may essentially be rectangular. Thus, the carrier may have two essentially rectangular sides that are situated opposite each other, i.e., a top and a bottom side—as well as four narrow lateral sides. As an alternative, the cross-section of the carrier may also be round or oval. In the fastened state, that is, in a state when the carrier is situated on a component of the single-track vehicle, e.g., an electric bicycle, one of the two sides may be pointing toward the component or the especially single-track vehicle, and the other side may be pointing away from the component. In the following text, the side pointing toward the component or the vehicle, in particular the electric bicycle, is referred to as the 'underside' and the side pointing away as the 'topside'.

The fastening device furthermore includes at least a first holding element, the first holding element being designed to fasten the carrier to a component. A drive unit and/or a frame, in particular, is/are provided as a component of the especially single-track vehicle. The first holding element may particularly be developed in such a way that it fastens the carrier to the component in a reversible manner, preferably with the aid of a screw connection.

According to an example embodiment of the present invention, the first holding element is made of metal and covers at least 50% of an in particular essentially rectangular side of the carrier that faces the component in a fastened state of the carrier. At least 50% of the underside may be enclosed and/or covered by the first holding element. This means that the first holding element covers and/or overlaps more than half of the surface of the underside of the carrier.

The transmitter and/or receiver device may include an antenna, e.g., a GPS antenna and/or a broadband mobile radio antenna.

Further features, advantages and additional embodiments of the present invention will be described in the following text or are disclosed in this text.

According to one advantageous embodiment of the present invention, a second holding element for fastening the carrier to the component of the in particular single-track vehicle is provided. More specifically, the carrier may be positioned on the component of the vehicle with the aid of the second holding element and fixed in place by the first holding element so that it is unable to move. This offers the advantage that the carrier can easily and reliably be fastened to the component of the vehicle. More particularly, deflections of the carrier that may arise during the ride due to shocks are reduced.

According to another advantageous further refinement of the present invention, the second holding element is embodied as a lug, a retaining eyelet and/or as a projection of the carrier. This is advantageous insofar as the second holding means can be positioned on a carrier element of the component of the in particular single-track vehicle in an uncomplicated manner. More specifically, the carrier is able to be inserted, locked in place in and/or snapped into the carrier element. To this end, the carrier element may have a corresponding opening and/or indentation, which is developed to accommodate the second holding element. The lug, the retaining eyelet and/or the projection of the carrier can be inserted, locked in place in and/or snapped into the opening of the carrier element. As an alternative or in addition, the carrier element may also have an indentation which is developed to accommodate the second holding element. The second holding element may particularly be inserted, locked in place in and/or snapped into the indentation of the carrier element.

According to another advantageous refinement of the present invention, the first holding element is disposed on the carrier by a keyed and/or frictional connection, in particular in a reversible manner. This offers the advantage that a reliable and flexible fastening is achievable in which the first holding element is disposed on the carrier, especially in an exchangeable or reversible manner, so that different first holding elements may be positioned on the carrier. As a result, the carrier is connectable to components or single-track vehicles having different dimensions, for example.

According to a further advantageous refinement of the present invention, the first holding element includes a carrier disk, which is situated on the carrier, in particular in a reversible manner, in particular screwed, locked in place in or snapped into the carrier. As an alternative or in addition, the first holding element includes a connection element which can be fastened to the component of the vehicle in a reversible manner. The connection element may particularly be screwed together with the component. For this purpose, the connection element has a through-opening. The connection element, for example, may be developed as a lug for this purpose. Such a connection element offers the advantage that the first holding element can be easily and reversibly fastened to the carrier and to the component of the vehicle, in particular the drive unit and/or the frame of the vehicle.

According to another advantageous refinement of the present invention, the first holding element may be positioned on the component of the in particular single-track vehicle with the aid of a screwed, locking, snap-in, bayonet-type and/or Velcro connection. This provides an easy way of fastening the first holding element to the component. In an advantageous manner, the first holding element may particularly be connected to the component of the vehicle, e.g., an electric bicycle, in a reversible manner so that the holding element can be removed from the electric bicycle for repair and/or maintenance purposes.

In one embodiment of the present invention, the first holding element is embodied as a ground plate or earth plate. To this end, the first holding element is situated on the component, especially on the frame, preferably in a galvanically coupled manner.

According to a further advantageous embodiment of the present invention, the first holding element and a circuit board situated on the carrier are galvanically separated. In particular, the transmitter and/or receiver device is/are situated at or on the circuit board. In addition, interfaces may be provided to establish a connection to an external device such as an electric bicycle. By positioning the first holding element and the circuit board with a galvanic separation, a separation of DC currents, in particular, is possible. The first holding element thus serves at least partly as an isolator or a shield of the DC current signals. The first holding element may be galvanically connected to a frame of the electric bicycle. This makes it possible for the first holding element to extend the reference plane up to and into the frame of the vehicle, of the electric bicycle, in particular.

According to a further advantageous refinement of the present invention, the first holding element and a circuit board situated on the carrier are capacitively coupled. This offers the advantage that a reference plane of the circuit board for the transmitter and/or receiver device is enlarged. In particular, capacitive coupling beyond an isolation between a reference plane of the transmitter and/or receiver device and the first holding element is possible. The capacitive coupling may particularly be enabled at a high-frequency alternating current, e.g., a GPS, LTE or similar signal. The first holding element thus has the effect of an extension for an AC signal that is conducted through a reference plane of the circuit board or is generated in the reference plane. This makes it possible to improve the efficiency of an antenna, for instance.

According to a further advantageous refinement of the present invention, the first holding element has a clearance of less than 5 mm, preferably of less than 3.5 mm, especially less than 2 mm, from a circuit board situated on the carrier. This allows for a better coupling between the circuit board and the first holding element. At the same time, the circuit board is able to be positioned on an in particular single-track vehicle in a space-saving manner.

According to an additional advantageous refinement of the present invention, a fastening element for fastening the first holding element to the component is provided. This has the advantage that the carrier is easily connectable to the vehicle, especially to the component of the vehicle such as a drive unit and/or a frame of the vehicle. The first holding element can therefore be connected either directly to the component or be connected to the component indirectly with the aid of the fastening element. The fastening element is particularly developed so that it is connectable to the drive unit on the one hand and to the frame on the other hand, in particular in a reversible manner. The fastening element serves as a frame connection element and, for instance, may act as a tolerance compensation element. In one embodiment, in which the first holding element is connected to the fastening element, the first holding element is connected at least to the drive unit and/or at least to the frame with the aid of the fastening element. The fastening element may particularly be embodied as a fastening plate, fastening angle or the like. It is preferably made of metal. The first holding element is preferably galvanically coupled with the fastening element.

The fastening element may be positioned on the component, i.e., the drive unit and/or the frame, with the aid of a screwed, locked, snap-in, bayonet-type and/or Velcro connection. In addition, the first holding element is able to be positioned on the fastening element with the aid of a screwed, locked, snap-in, bayonet-type and/or Velcro connection.

According to a further advantageous refinement of the present invention, a carrier element is provided for fastening the second holding element to a component. The carrier element may be produced from a man-made material, in particular plastic and/or rubber. For instance, the carrier element may be fixed in place on the component, in particular the drive unit of the in particular single-track vehicle, with the aid of a negative allowance fit. As an alternative or in addition, the carrier element can also be fixed in place on the fastening element, for instance with the aid of a negative allowance fit.

In one embodiment of the present invention, the carrier element has an opening and/or an indentation to accommodate the second holding element. More specifically, the second holding element is able to be inserted, snapped and/or latched into the opening and/or the indentation.

Further important features and advantages of the present invention may be gathered from the disclosure herein.

It is of course understood that the above-mentioned features and the features still to be described in the following text may be used not only in the indicated combinations but also in other combinations or on their own without departing from the framework of the present invention.

Preferred developments and embodiments of the present invention are shown in the figures and will be described in greater detail in the following description; identical reference numerals relate to identical or similar or functionally equivalent components or elements.

DETAILED DESCRIPTION OF EXAMPLE EMBODIMENTS

Figure 1A:
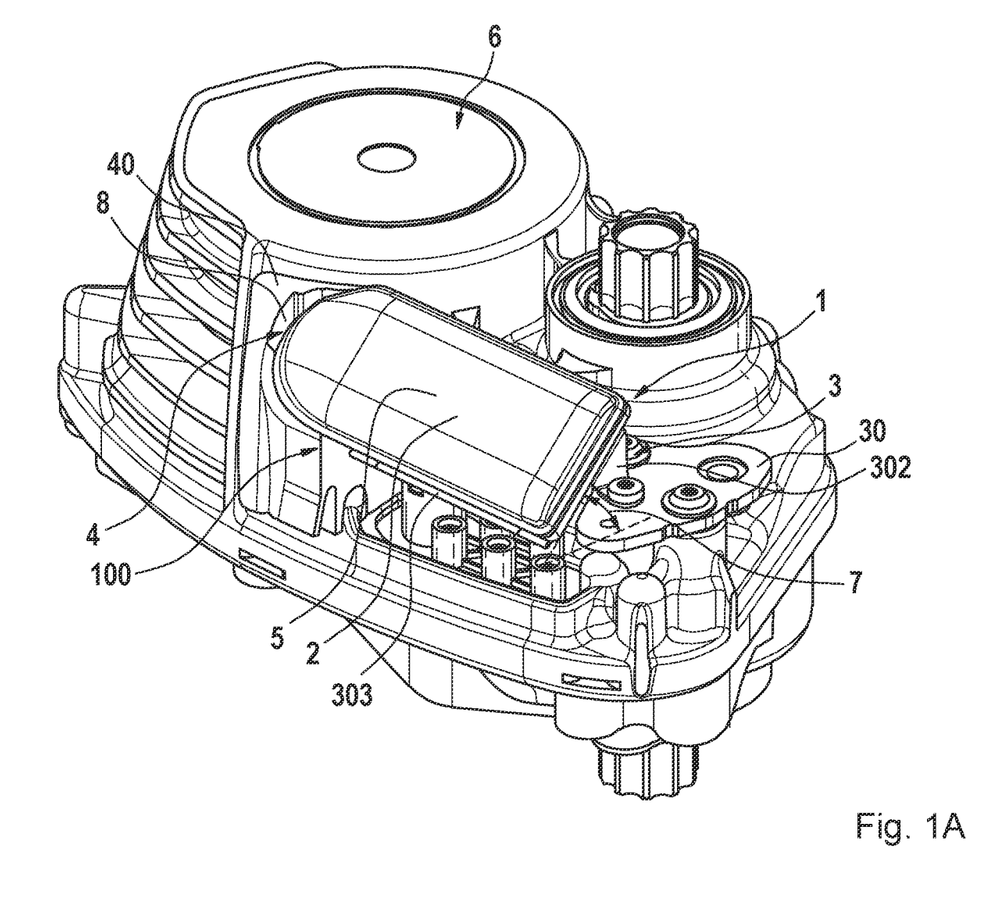
FIG. 1A shows a drive unit having a fastening device according to an example embodiment of the present invention in a schematic representation.

FIG. 1A shows a drive unit having a fastening device according to an embodiment of the present invention in a schematic illustration.

FIG. 1A shows a communications unit 100 on a drive unit 6. In addition, a fastening device 1 is shown, which includes a carrier 2, a first holding element 3 and a second holding element 4. Carrier 2 has an essentially rectangular topside 5 with rounded corners, two corners in the region of second holding element 4 being essentially completely rounded and forming a semicircle in a top view. First holding element 3 includes a connection element 302 and a carrier disk 303. With the aid of a fastening element 30, first holding element 3 is fixed in place on drive unit 6, fastening element 30 being optional and replaceable with other fastening elements or fastening methods, or it can be omitted. Fastening element 30 in the illustrated embodiment is fastened to drive unit 6 and to connection element 302 with the aid of a screw connection. Fastening element 30 is embodied as a fastening plate. Fastening element 30 is connected, in particular screwed, to drive unit 6. Fastening element 30 is also connected to frame 9 (not shown) with the aid of screws, in particular. Fastening element 30 is therefore situated between drive unit 6 and frame 9 and connected to both, drive unit 6 and frame 9, in a reversible manner, in particular with the aid of screws. In other words, drive unit 6 is indirectly connected to frame 9 by fastening element 30, in particular screwed together. Fastening element 30 serves as a frame connection element and may be used as a tolerance compensation element, for instance. Connection element 302 is connected to carrier disk 303, and carrier disk 303 is situated on carrier 2 and supports carrier 2. In the illustrated embodiment, connection element 302 is connected to carrier disk 303 in one piece (see FIG. 4). Connection element 302 is situated on carrier disk 303 at an angle. With the aid of connection element 302, communications unit 100 is able to be fastened to drive unit 6 in a defined position and/or at a defined angle in a reliable and reproducible manner.

Fastening element 30, here in the form of a frame connection element, and carrier disk 303 are spaced apart from each other at an angle 7 by connection element 302. This means that a plane along carrier disk 303 and a plane along fastening element 30 meet at an angle 7. This makes it possible to position carrier 2 at any desired yet defined angle relative to drive unit 6. In the embodiment according to FIG. 1A, the angle amounts to −40°, by way of example. Other angles are also possible, however.

Second holding element 4 is inserted into a carrier element 40, carrier element 40 possibly being produced from rubber. Carrier 2 rests on carrier element 40 with the aid of second holding element 4 and is supported by carrier element 40. For this purpose, carrier element 40 has a bulging or indentation 8. Carrier element 40 is in turn fastened to drive unit 6, for instance with the aid of a negative allowance fit. When communications unit 100 is mounted on drive unit 6, carrier 2 can be positioned on carrier element 40 with the aid of second holding element 4 and fixed in position by first holding element 3, for instance by screwing first holding element 3 and fastening element 30 together.

Figure 1B:
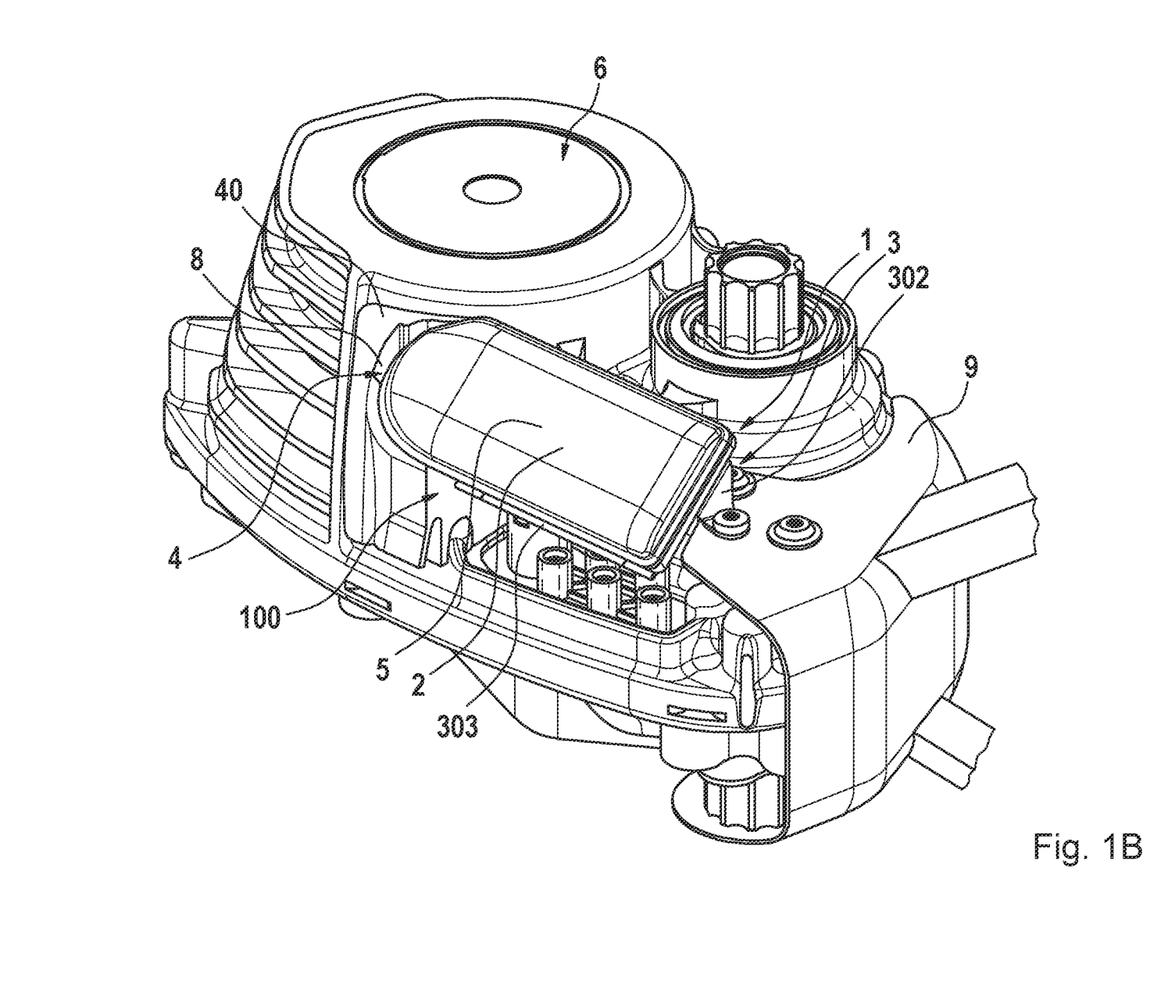
FIG. 1B shows a drive unit having a fastening device according to an example embodiment of the present invention in a schematic representation.

FIG. 1B shows a drive unit having a fastening device according to an embodiment of the present invention in a schematic representation.

FIG. 1B shows a further possible positioning of fastening device 1. Connection element 302 of first holding element 3 is connected directly to a frame 9. Like in FIG. 1A, carrier 2 is positioned with a second holding element 4 in a carrier element 40. In contrast to FIG. 1A, however, connection element 302 is not situated on a drive unit 6 with the aid of a fastening element but is fastened directly to a frame 9 of an in particular single-track vehicle (not shown). Drive unit 6 is also connected to frame 9, especially by a screwed connection. In the illustrated embodiment according to FIG. 1B, drive unit 6 is connected directly to frame 9, especially by screws, rather than being connected indirectly via fastening element 30 in the form of a fastening plate, as in the embodiment according to FIG. 1A.

Figure 2A:
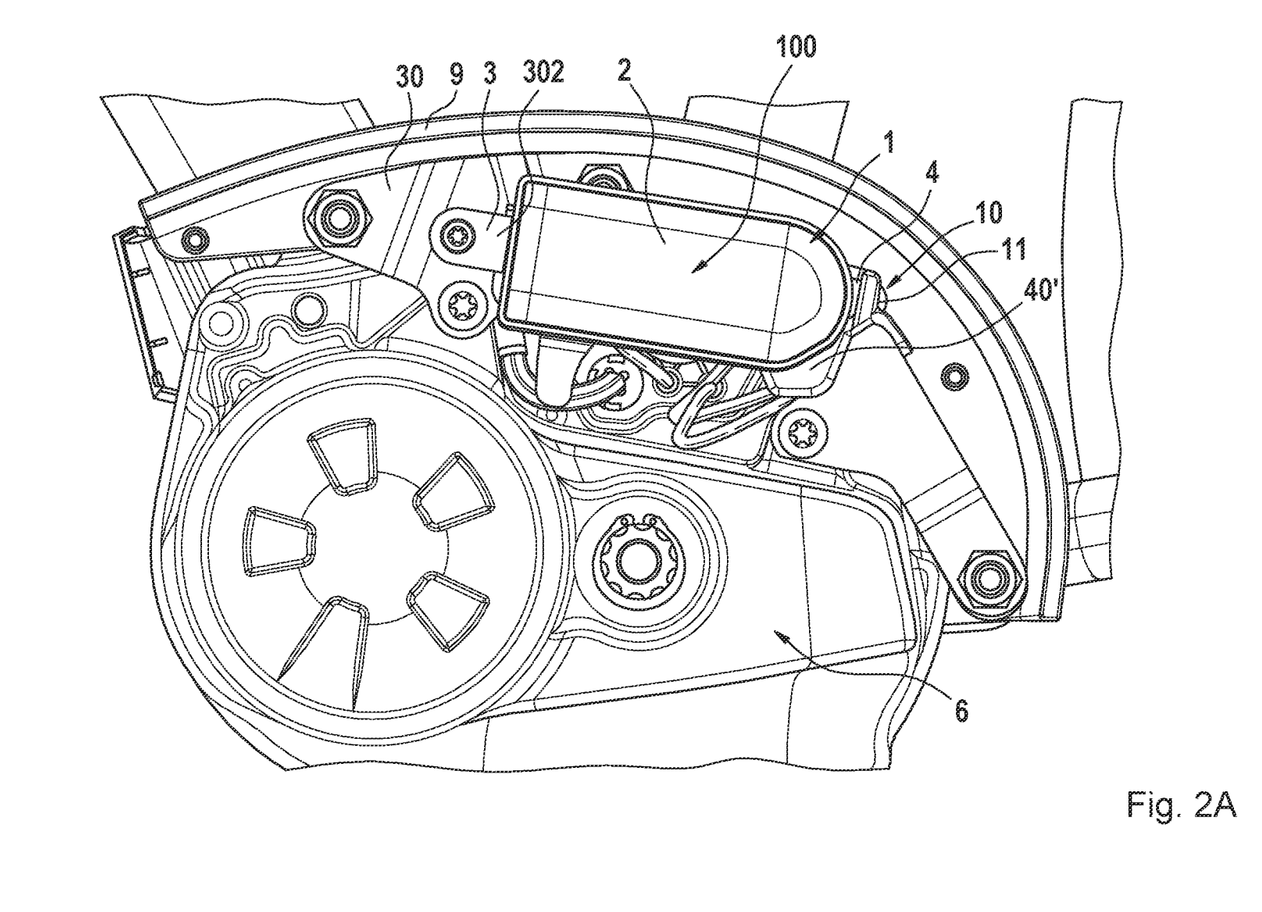
FIG. 2A shows a drive unit having a fastening device according to an example embodiment of the present invention in a schematic representation.

FIG. 2A shows a drive unit having a fastening device according to an embodiment of the present invention in a schematic representation.

FIG. 2A shows a further possible positioning of a communications unit 100 on a drive unit 6 with the aid of a fastening device 1. For the positioning on a carrier element 40', carrier 2 has a second holding element 4 in the form of a lug 10, which is inserted into a corresponding opening 11 in carrier element 40'. In the embodiment according to FIG. 2A, carrier element 40' is situated on fastening element 30, e.g., with a negative allowance fit. When communications unit 100 is mounted on drive unit 6, carrier 2 with lug 10 is slipped into opening 11 and screwed together with a fastening element 30 with the aid of first holding element 3, especially with the aid of a connection element 302, so that fastening element 30 fixes carrier 2 in place on a frame 9 or on drive unit 6. Fastening element 30 may be fastened to frame 9 with the aid of a screwed connection, a negative allowance fit or a keyed connection. In addition, fastening element 30 is fastened to drive unit 6, in particular with the aid of screws. Fastening element 30 is embodied as a fastening plate. Fastening element 30 is connected to drive unit 6, especially by screws. Fastening element 30 is also connected to frame 9, also by screws. As already shown in the embodiment according to FIG. 1A, fastening element 30 is therefore situated between drive unit 6 and frame 9 and connected to both, i.e., drive unit 6 and frame 9, in a reversible manner, in particular by screws. In other words, drive unit 6 is connected, in particular screwed together, with frame 9 with the aid of fastening element 30. Fastening element 30 serves as a frame connection element and may be used to compensate for tolerances, for example.

Figure 2B:
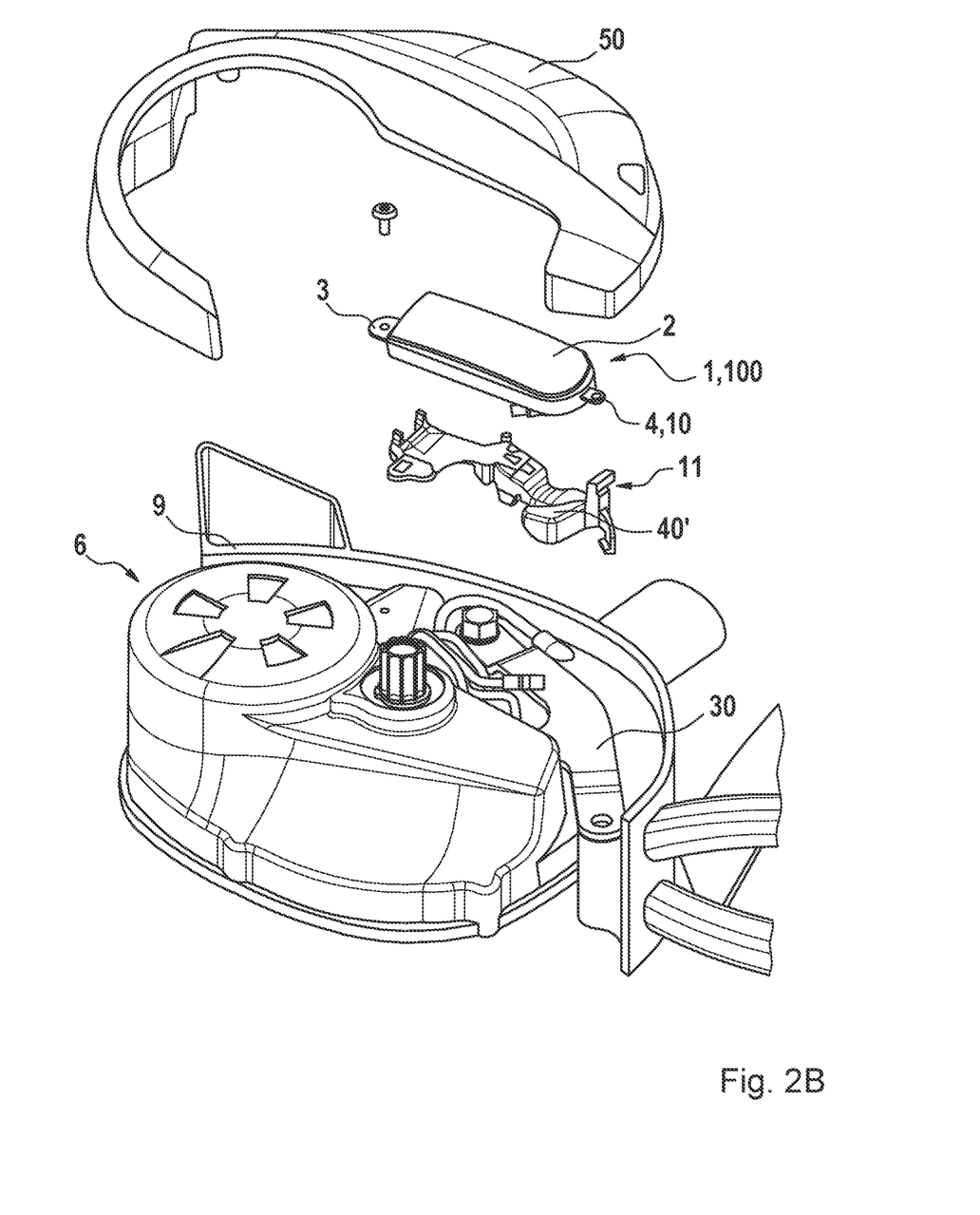
FIG. 2B shows a drive unit having a fastening device according to an example embodiment of the present invention in a schematic representation.

FIG. 2B shows a drive unit having a fastening device according to an embodiment of the present invention in a schematic representation.

FIG. 2B shows a possible positioning of fastening device 1 in an exploded view. Fastening element 30 is reversibly connected to frame 9 and reversibly connected also to drive unit 6, in particular by screws. Carrier element 40' is fixed in place on fastening element 30. Carrier element 40' acts as a holder for carrier 2. For this purpose, carrier 2 has second holding element 4 in the form of a lug 10. Second holding element 4 of carrier 2 is inserted into opening 11 of carrier element 40' to position carrier 2 on drive unit 6 or frame 9. Via first holding element 3, fastening device 1 is fixed in place on fastening element 30. A cover 50 protects fastening device 1 from fluids and dirt.

Figure 3:
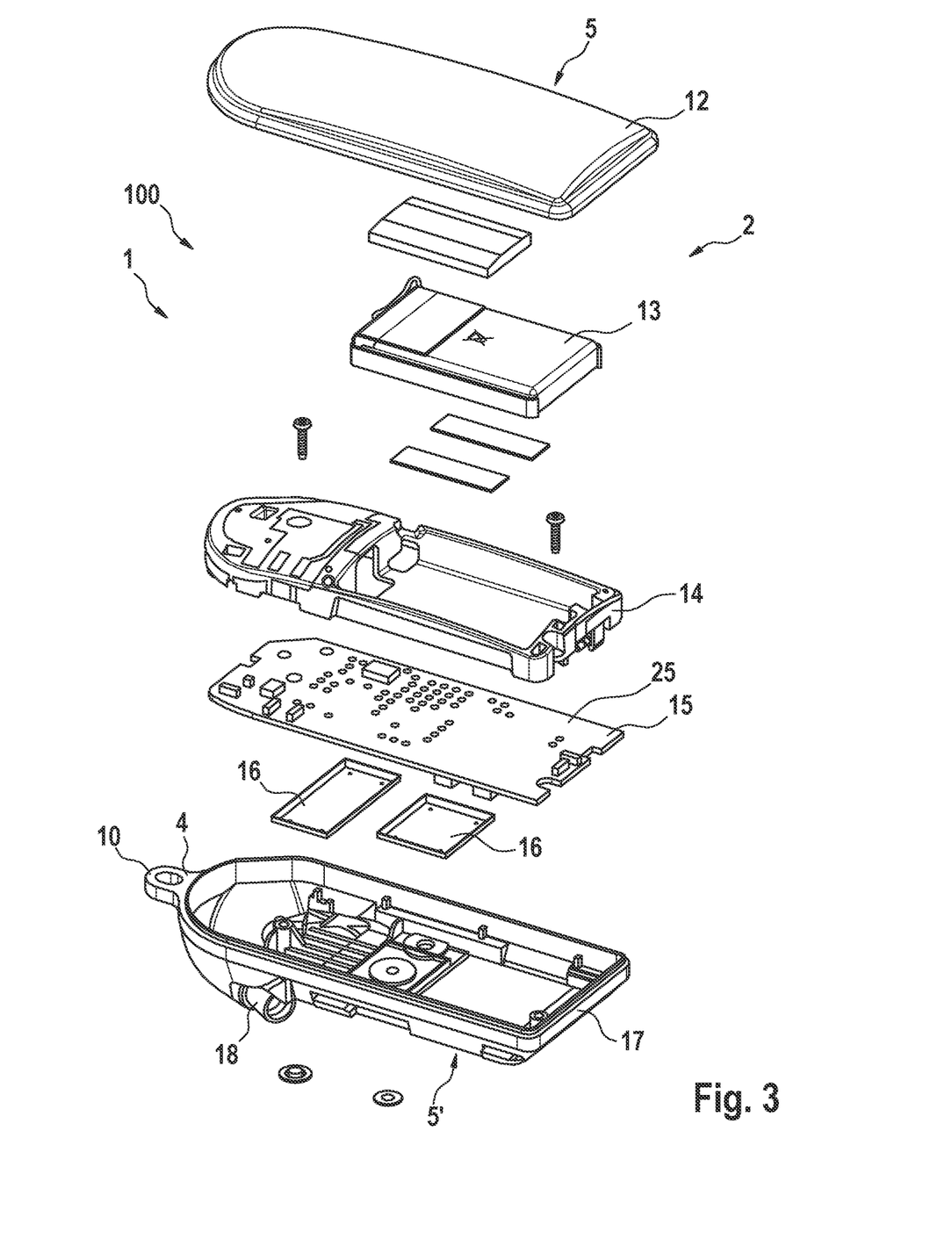
FIG. 3 shows an exploded drawing of a carrier of a fastening device according to an example embodiment of the present invention in a schematic representation.

FIG. 3, by way of example and in a schematic representation, shows an exploded view of a carrier of a fastening device according to an embodiment of the present invention.

FIG. 3 shows an exploded view of communications unit 100 which includes carrier 2 of fastening device 1. Carrier 2 has a cover 12, a battery 13, an antenna carrier 14, a PCB circuit board 15, two shielding elements 16, and a bottom 17. Battery 13 and PCB circuit board 15 are fixed in place in antenna carrier 14. Via battery 13, electrical components (not shown) on PCB circuit board 15 are supplied with energy. PCB circuit board 15 together with electrical components and an antenna (not shown) are part of a transmitter and/or receiver device 25. Some of the electrical components on PCB circuit board 15 are shielded from electromagnetic radiation by shielding elements 16 which are situated on PCB circuit board 15. Via guide openings 18, PCB circuit board 15 is able to be connected by wires to an external device (not shown) for a current supply and/or for transmitting and/or receiving data.

With the aid of second holding element 4 in the form of a lug 10 disposed on bottom 17, carrier 2 is able to be positioned on a carrier element (not shown), in particular inserted into a carrier element. Examples of carrier elements 40, 40' are shown in FIGS. 1A, 1B, 2A, and 2B.

In a fastened state of carrier 2, cover 12 has topside 5 and bottom 17 has underside 5'.

Because of a modular design, antenna carrier 14 with PCB circuit board 15 is able to be removed from carrier 2 and replaced with another electronics device.

Figure 4:
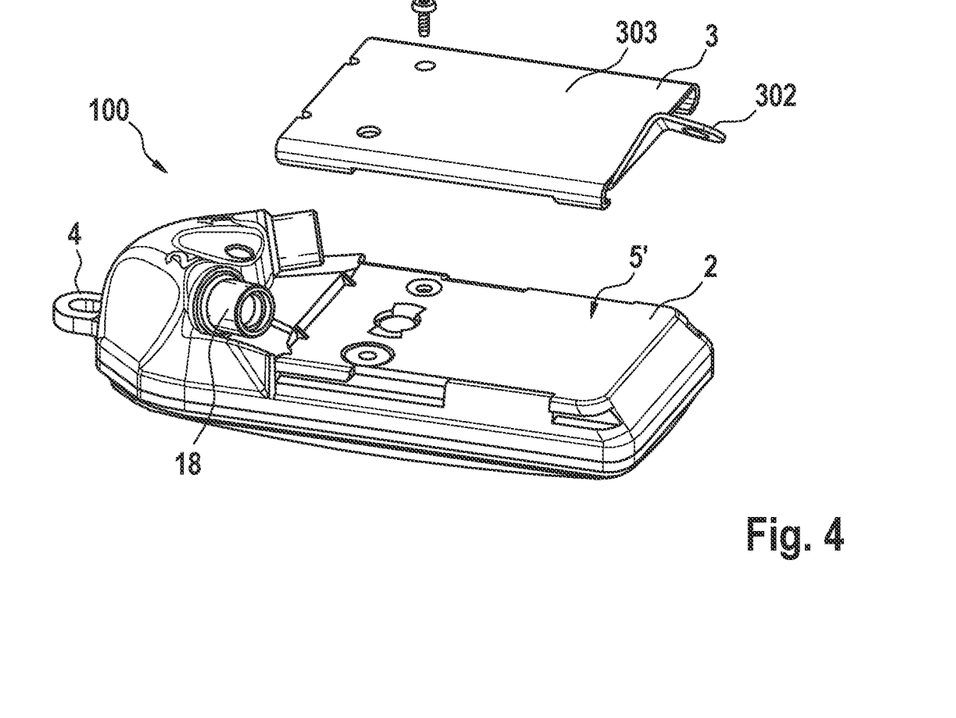
FIG. 4 shows a carrier of a fastening device according to an example embodiment of the present invention in a schematic representation.

FIG. 4 shows a carrier of a fastening device according to an embodiment of the present invention in a schematic representation.

A carrier disk 303 of a first holding element 3 is fixed in place by a screw on underside 5' of carrier 2 shown in FIG. 4. Because of the screw, carrier disk 303 is connected to carrier 2 in a reversible manner, which means that first holding element 3, including carrier disk 303 and a connection element 302, is able to be exchanged. This makes it possible to mount carrier 2 on different drive units or single-track vehicles, in particular. More specifically, the angle between carrier 2 and the drive unit or the in particular single-track vehicle is able to be adapted by a suitably developed first holding element 3.

Carrier disk 303 surrounds or covers at least 50% of underside 5' of carrier 2 so that an electric coupling between the reference plane of the antenna in PCB circuit board 15 and carrier disk 303 is provided.

Figure 5:
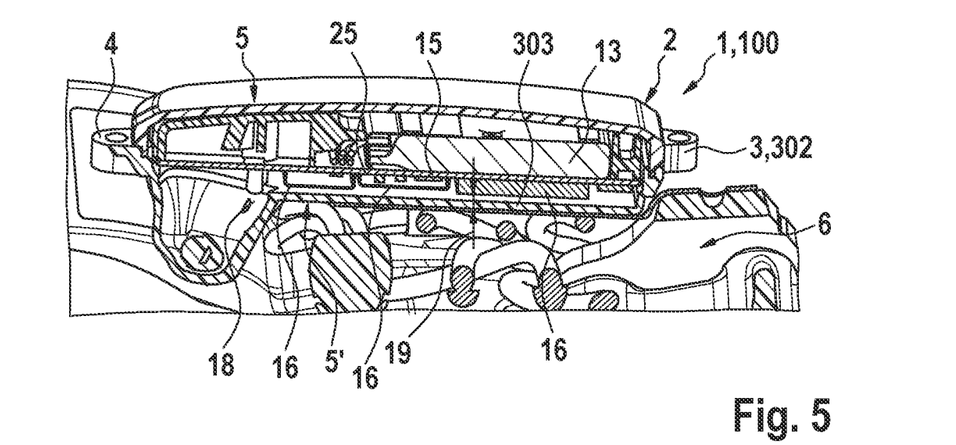
FIG. 5 shows a sectional view of a fastening device according to an example embodiment of the present invention in a schematic representation.

FIG. 5 shows a sectional view of a fastening device according to an embodiment of the present invention in a schematic representation.

FIG. 5 shows a communications unit 100 including carrier 2 in a cross-section. Battery 13 and transmitter and/or receiver device including PCB circuit board 15 are positioned in carrier 2. Shielding elements 16 shield PCB circuit board 15 in the direction of drive unit 6. Because of carrier disk 303, which surrounds at least 50% of underside 5' of carrier 2, the shielding can be further improved. Since first holding element 3 is made of metal and fixed in place directly on drive unit 6, they are galvanically connected. Due to the small clearance between carrier disk 303 and shielding elements 16, the reference plane of PCB circuit board 15 is capacitively coupled with carrier disk 303. Drive unit 6, and especially carrier disk 303, thus acts as an extended reference plane for PCB circuit board 15, i.e., is part of the reference plane of PCB circuit board 15, especially part of the reference plane of an antenna (not shown) of PCB circuit board 15.

Clearance 19 between carrier disk 303 and a shielding element 16 amounts to 2 mm or less.

Underside 5' is pointing toward drive unit 6, and topside 5 is pointing away from drive unit 6. This makes it possible for the antenna on PCB circuit board 15 to transmit and receive data via topside 5 without metallic objects affecting the transmitter and/or receiver power. At the same time, carrier disk 303 partly protects the antenna from interference from below by drive unit 6.

By way of guide openings 18, PCB circuit board 15 is connected to an external device (not shown) of drive unit 6 or the in particular single-track vehicle. The external device may include a control unit and/or an energy supply device, for example.

Figure 6:
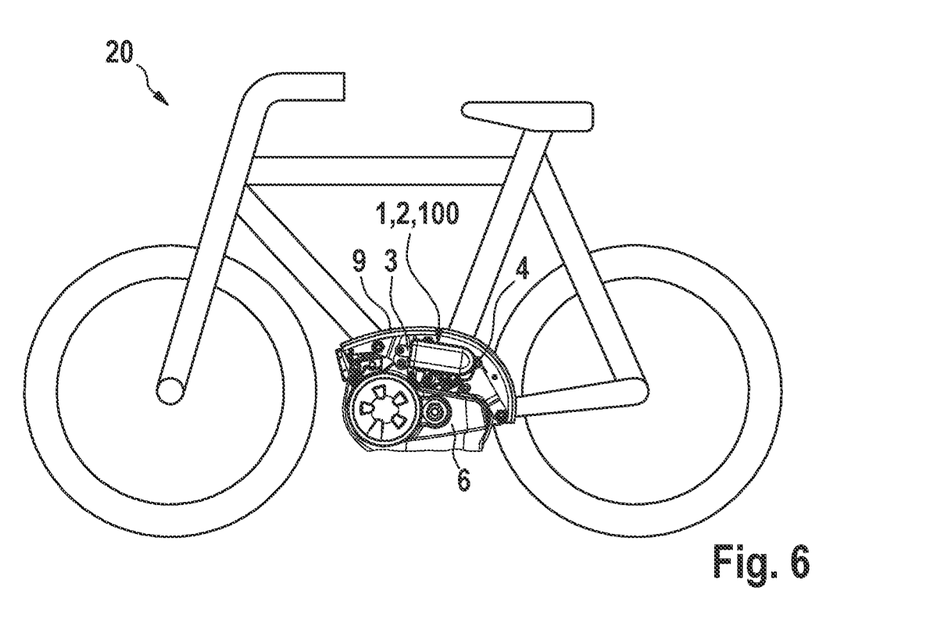
FIG. 6 shows a single-track vehicle according to an example embodiment of the present invention in a schematic representation.

FIG. 6 shows a single-track vehicle according to an embodiment of the present invention in a schematic representation.

FIG. 6 shows a single-track vehicle 20 having a drive unit 6 and a communications unit 100 with fastening device 1 for fastening electromagnetic transmitter and/or receiver device 25 to drive unit 6 or frame 9. Fastening device 1 includes a first holding element 3, a second holding element 4, and a carrier 2 such as in the embodiments of FIGS. 2A and 2B, for example. Carrier 2 is fixed in position on drive unit 6 or on frame 9 by fastening device 1.

In summary, at least one embodiment of the present invention has at least one of the following features and/or provides at least one of the following advantages:

Reliable fastening of a transmitter and/or receiver device to an in particular single-track vehicle such as an electric bicycle, a high transmission and/or receiving power of the transmitter and/or receiver device, flexible positioning of the transmitter and/or receiver device in terms of the angle and position of the transmitter and/or receiver device on an in particular single-track vehicle such as an electric bicycle.

Although the present invention has been described based on preferred exemplary embodiments, it is not restricted to such embodiments but may be modified in a variety of ways.

What is claimed is:

1. A communications unit, comprising:
an electromagnetic transmitter and/or receiver device; and
a fastening device for the electromagnetic transmitter and/or receiver device configured to fasten to a component of a vehicle, the fastening device including:
a flat, essentially rectangular carrier, having two oppositely situated sides on which the transmitter and/or receiver device is situated, and
at least a first holding element configured to fasten the carrier to the component, the first holding element being made from metal and the first holding element covering at least 50% of an essentially rectangular side of the carrier facing the component in a fastened state of the carrier.

2. The communications unit as recited in claim 1, wherein the component is a drive unit or a frame of the vehicle, and wherein the vehicle is an electric bicycle.

3. The communications unit as recited in claim 1, wherein a second holding element is provided for fastening the carrier to the component of the vehicle.

4. The communications unit as recited in claim 3, wherein the second holding element is a lug and/or a retaining eyelet and/or a projection of the carrier.

5. The communications unit as recited in claim 1, wherein the first holding element is positioned on the carrier by a keyed and/or frictional connection, in a reversible manner.

6. The communications unit as recited in claim 3, wherein a carrier element is configured to fasten the second holding element to the component.

7. The communications unit as recited in claim 6, wherein the carrier element has an opening and/or an indentation to accommodate the second holding element.

8. The communications unit as recited in claim 1, wherein the first holding element is configured to be positioned on the component using a screwed and/or clip-on and/or snap-in and/or bayonet-type and/or Velcro connection.

9. The communications unit as recited in claim 1, wherein the first holding element includes a carrier disk, which is situated on the carrier in a reversible manner, and/or a connection element which is configured to be fastened to the component in a reversible manner.

10. The communications unit as recited in claim 1, wherein the first holding element is a ground plate.

11. The communications unit as recited in claim 1, wherein the first holding element is situated on the component in a galvanically coupled manner.

12. The communications unit as recited in claim 1, wherein the first holding element and a circuit board situated on the carrier are galvanically separated.

13. The communications unit as recited in claim 1, wherein the first holding element and a circuit board situated on the carrier are capacitively coupled.

14. The communications unit as recited in claim 1, wherein the first holding element has a clearance of less than 5 mm from a circuit board situated on the carrier.

15. The communications unit as recited in claim 1, wherein a fastening element is provided for fastening the first holding element to the component.

16. The communications unit as recited in claim 15, wherein the fastening element is embodied a fastening plate or a fastening angle.

17. The communications unit as recited in claim 15, wherein the fastening element is made of metal.

18. The communications unit as recited in claim 15, wherein the first holding element is galvanically coupled with the fastening element.

19. The communications unit as recited in claim 15, wherein the fastening element is configured to be positioned on the component using a screwed and/or snap-in and/or latched and/or bayonet-type and/or Velcro connection.

20. The communications unit as recited in claim 15, wherein the first holding element is configured to be positioned on the fastening element using a screwed and/or snap-in and/or latched and/or bayonet-type and/or Velcro connection.

21. A single-track vehicle, comprising:
a communications unit including:
an electromagnetic transmitter and/or receiver device, and
a fastening device for the electromagnetic transmitter and/or receiver device configured to fasten to a component of the vehicle, the fastening device including:
a flat, essentially rectangular carrier, having two oppositely situated sides on which the transmitter and/or receiver device is situated, and
at least a first holding element configured to fasten the carrier to the component, the first holding element being made from metal and the first holding element covering at least 50% of an essentially rectangular side of the carrier facing the component in a fastened state of the carrier.

22. The vehicle as recited in claim 21, wherein the fastening device configured to be positioned on a frame and/or a drive unit of the vehicle.

23. A drive unit for a single-track vehicle, comprising:
a communications unit including:
an electromagnetic transmitter and/or receiver device, and
a fastening device for the electromagnetic transmitter and/or receiver device configured to fasten to a component of the vehicle, the fastening device including:
a flat, essentially rectangular carrier, having two oppositely situated sides on which the transmitter and/or receiver device is situated, and
at least a first holding element configured to fasten the carrier to the component, the first holding element being made from metal and the first holding element covering at least 50% of an essentially rectangular side of the carrier facing the component in a fastened state of the carrier.

\* \* \* \* \*